US011533559B2

(12) United States Patent
Kovvali et al.

(10) Patent No.: US 11,533,559 B2
(45) Date of Patent: Dec. 20, 2022

(54) BEAMFORMER ENHANCED DIRECTION OF ARRIVAL ESTIMATION IN A REVERBERANT ENVIRONMENT WITH DIRECTIONAL NOISE

(71) Applicant: CIRRUS LOGIC INTERNATIONAL SEMICONDUCTOR LTD., Edinburgh (GB)

(72) Inventors: Narayan Kovvali, Mesa, AZ (US); Ghassan Maalouli, Mesa, AZ (US); Seth Suppappola, Mesa, AZ (US)

(73) Assignee: Cirrus Logic, Inc., Austin, TX (US)

( * ) Notice: Subject to any disclaimer, the term of this patent is extended or adjusted under 35 U.S.C. 154(b) by 404 days.

(21) Appl. No.: 16/684,190

(22) Filed: Nov. 14, 2019

(65) Prior Publication Data
US 2021/0149007 A1 May 20, 2021

(51) Int. Cl.
*H04R 3/00* (2006.01)
*G01S 3/80* (2006.01)
*G10L 21/0264* (2013.01)
*G10L 21/0208* (2013.01)
*G10L 21/0216* (2013.01)

(52) U.S. Cl.
CPC ............ *H04R 3/005* (2013.01); *G01S 3/8006* (2013.01); *G10L 21/0208* (2013.01); *G10L 21/0264* (2013.01); *G10L 2021/02082* (2013.01); *G10L 2021/02166* (2013.01)

(58) Field of Classification Search
None
See application file for complete search history.

(56) References Cited

U.S. PATENT DOCUMENTS 9,532,138 B1 * 12/2016 Allen .................... H04R 3/005
10,986,437 B1 * 4/2021 Pan ...................... H04R 1/326
(Continued)

OTHER PUBLICATIONS

Knapp, Charles H. et al. "The Generalized Correlation Method for Estimation of Time Delay." IEEE Transactions on Acoustics, Speech, and Signal Processing, vol. ASSP-24, No. 4, Aug. 1976. pp. 320-327.

(Continued)

*Primary Examiner* — Antim G Shah
(74) *Attorney, Agent, or Firm* — E. Alan Davis; Huffman Law Group, PC

(57) ABSTRACT

An estimator of direction of arrival (DOA) of speech from a far-field talker to a device in the presence of room reverberation and directional noise includes audio inputs received from multiple microphones and one or more beamformer outputs generated by processing the microphone inputs. A first DOA estimate is obtained by performing generalized cross-correlation between two or more of the microphone inputs. A second DOA estimate is obtained by performing generalized cross-correlation between one of the one or more beamformer outputs and one or more of: the microphone inputs and other of the one or more beamformer outputs. A selector selects the first or second DOA estimate based on an SNR estimate at the microphone inputs and a noise reduction amount estimate at the beamformer outputs. The SNR and noise reduction estimates may be obtained based on the detection of a keyword spoken by a desired talker.

14 Claims, 4 Drawing Sheets

(56) References Cited

U.S. PATENT DOCUMENTS

2012/0224456 A1* 9/2012 Visser .................... G01S 7/521
                                                            367/118
2017/0134849 A1* 5/2017 Pandey ............... G10L 21/0232
2019/0349678 A1* 11/2019 Janse ................. G10L 21/0216

OTHER PUBLICATIONS

Dibiase, Joseph H. et al. "Robust Localization in Reverberant Rooms." *Microphone Arrays*. Springer-Verlag Berlin Heidelberg 2001. pp. 157-180.

Gannot, Sharon et al. "Signal Enhancement Using Beamforming and Nonstationary with Applications to Speech." IEEE Transactions on Signal Processing. vol. 49, No. 8. Aug. 2001. pp. 1614-1626.

Chen, Jingdong et al. "Time Delay Estimation in Room Acoustic Environments: An Overview." EURASIP Journal on Applied Signal Processing. vol. 2006, Article ID 26503. pp. 1-19.

* cited by examiner

BEAMFORMER ENHANCED DIRECTION OF ARRIVAL ESTIMATION IN A REVERBERANT ENVIRONMENT WITH DIRECTIONAL NOISE

BACKGROUND

In far-field audio processing devices for smart-home applications, it is of interest to estimate the direction of arrival (DOA) of speech from a desired talker to a device in a room. For example, the DOA estimate can be used to provide direct visual feedback to the user about the readiness of a smart home device to receive voice commands. The DOA estimate can also be used as a spatial cue to enhance the performance of the audio processing system. The DOA is estimated by analyzing audio signals measured using multiple microphones located on the device. Several factors make DOA estimation in smart-home environments a challenging problem.

First, in a room environment the sound from the talker arrives at the device from multiple directions because sound propagation in a room is comprised not only of the direct path—the desired DOA—but also multipath reflections from surfaces and room reverberation that interfere with the direct path arrival. It is typical for the talker to be several meters away from the device, i.e., in the far-field, such that the reflections and reverberation components can be stronger than the direct-path arrival. This low direct-to-reverberation ratio (DRR) can result in large DOA estimation errors.

Second, the measured microphone signals are often corrupted with microphone self-noise and acoustic noise, and the signal-to-noise ratio (SNR) is low when the talker is in the far-field. Accurate DOA estimation becomes particularly challenging because many of the acoustic noise sources commonly encountered in home environments, such as television (TV) or music systems, tend to be directional, which can add significant bias to the DOA estimate.

A plethora of DOA estimation methods exist in the literature. See for example, J. H. DiBiase, H. F. Silverman, and M. S. Brandstein, "Robust Localization in Reverberant Rooms," *Microphone Arrays*, Chapter 8. Springer-Verlag 2001, for an overview of several methods. These include steered beamforming, parametric spectral estimation/eigen-analysis, and time difference of arrival (TDOA) based methods. Many DOA estimation techniques utilize a simple free-field or anechoic propagation model, where the environment is free of multipath reflections and reverberation. Most methods also assume that the noise is diffused, i.e., the noise has no directional component. These approaches are, thus, not suitable for smart-home applications. Advanced DOA estimation methods that do not rely on these simplifying assumptions usually require specific a priori knowledge such as the source spectrum or autocorrelation structure and reverberation/room impulse response (RIR) models, which is typically not available in real applications. These techniques are also computationally expensive, which limits their utility for practical real-time implementation in smart-home applications.

A classic DOA estimation scheme that is well known for its robustness to the effects of reverberation is based on the generalized cross-correlation phase transform (GCC-PHAT) method described in C. Knapp and G. Carter, "The generalized correlation method for estimation of time delay," in *IEEE Transactions on Acoustics, Speech, and Signal Processing*, vol. 24, no. 4, pp. 320-327, August 1976. This approach utilizes the inter-microphone cross-spectrum phase for estimating the DOA. The GCC-PHAT DOA estimate is given by equation (1), $$\hat{\theta} = \underset{\theta}{\mathrm{argmax}} \sum_{m,n} \int_{-\infty}^{\infty} \frac{1}{|P_{x_m x_n}(f)|} P_{x_m x_n}(f) e^{j2\pi f \tau_{mn}(\theta)} df \quad (1)$$

where $\hat{\theta}$ denotes the DOA estimate, $P_{x_m x_n}(f)$ denotes the cross-spectrum for the mth and nth microphone signals, $x_m$ and $x_n$ respectively, $\tau_{mn}(\theta)$ denotes the time delay for sound propagating from the mth microphone to the nth microphone for a source at DOA $\theta$, j denotes the imaginary number, and f is frequency. By ignoring the magnitude of the inter-microphone cross-spectrum, phase information from all frequencies is equally weighted. This equal weighting works well in the presence of multipath and reverberation because the DRR is roughly the same at all frequencies. Unfortunately, the performance of GCC-PHAT degrades in noise due to contribution from frequency bands with poor SNR.

SUMMARY

While generalized cross-correlation techniques, e.g., the GCC-PHAT technique, may provide robustness to room reverberation, they may be sensitive to noise and may be inadequate by themselves to effectively estimate the DOA of speech from a far-field talker in a home environment. Described are embodiments of a DOA estimation approach for smart home applications that combines the reverberation robustness of GCC-PHAT with the significant directional noise reduction capability provided by a beamformer. Specifically, instead of relying solely on the noisy multi-microphone input data to estimate the DOA, embodiments utilize both the multi-microphone inputs and the noise-reduced output from a beamformer. A beamformer output-based DOA estimate is obtained by applying generalized cross-correlation (e.g., GCC-PHAT) between the microphone inputs and the beamformer output. In one embodiment, an adaptive selection procedure is applied, wherein the beamformer output-based DOA estimate is selected when the input SNR is low and the noise reduction (NR) amount is high; otherwise, the standard DOA estimate based on the microphone inputs is selected. In one embodiment, the SNR is estimated based on signal and noise levels measured upon the detection of a keyword from the desired talker.

In one embodiment, the present disclosure provides an estimator of a DOA of speech from a far-field talker to a device in the presence of room reverberation and directional noise. The DOA estimator includes audio inputs received from multiple (two or more) microphones, one or more noise-reduced outputs generated by processing the multiple microphone inputs using one or more beamformers, and a digital signal processor (DSP) that estimates the DOA by performing generalized cross-correlation between one of the one or more beamformer outputs and one or more of: the multiple microphone inputs and other of the one or more beamformer outputs.

In another embodiment, the present disclosure provides a method for estimating DOA of speech from a far-field talker to a device in the presence of room reverberation and directional noise. The method includes receiving audio inputs from multiple (two or more) microphones, generating one or more noise-reduced outputs by processing the multiple microphone inputs using one or more beamformers, and estimating the DOA by performing generalized cross-correlation between one of the one or more beamformer outputs and one or more of: the multiple microphone inputs and other of the one or more beamformer outputs.

In yet another embodiment, the present disclosure provides an estimator of a final DOA of speech from a far-field talker to a device in the presence of room reverberation and directional noise. The DOA estimator includes a first DOA estimate obtained by correlating inputs of multiple microphones (referred to as "microphone input-based DOA estimate") and a second DOA estimate obtained by correlating a beamformer output and at least one of: the multiple microphone inputs and one or more other beamformer outputs (henceforth referred to as "beamformer output-based DOA estimate"). The DOA estimator also includes one or more of: a SNR estimate at at least one of the multiple microphone inputs and a NR amount estimate at the beamformer output. The DOA estimator also includes a selector that selects one of the first DOA estimate and the second DOA estimate as the final DOA estimate based on at least one of the SNR estimate and the NR amount estimate.

In yet another embodiment, the present disclosure provides a method for estimating a final DOA of speech from a far-field talker to a device in the presence of room reverberation and directional noise. The method includes estimating a first DOA by correlating inputs of multiple microphones and estimating a second DOA by correlating a beamformer output and at least one of: the multiple microphone inputs and one or more other beamformer outputs. The method also includes estimating one or more of: a SNR at at least one of the multiple microphone inputs and a NR amount at the beamformer output. The method also includes selecting one of the first DOA estimate and the second DOA estimate as the final DOA estimate based on at least one of the SNR estimate and the NR amount estimate.

DETAILED DESCRIPTION

Figure 1:
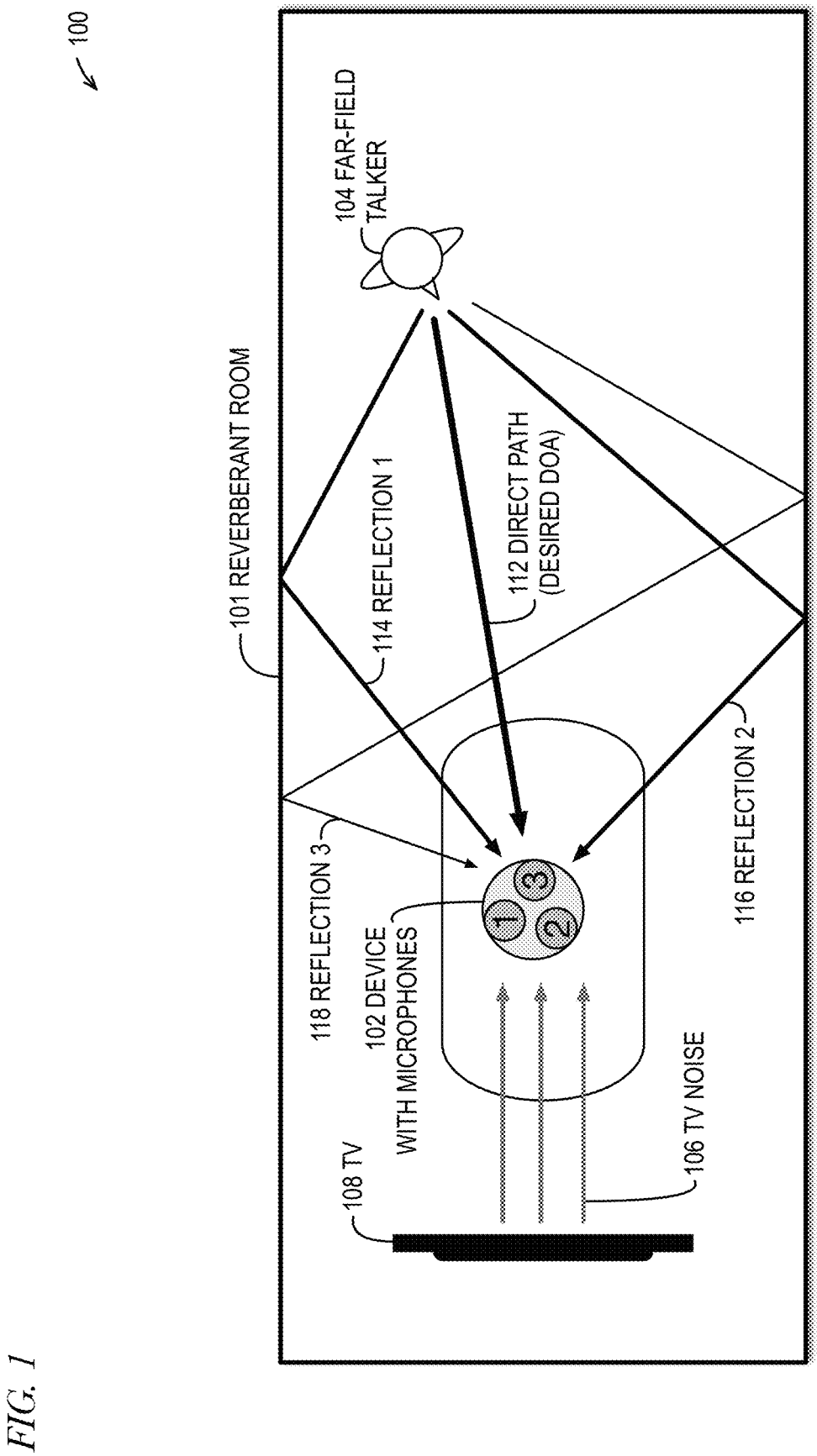
FIG. 1 is an example of a smart-home environment 100 that includes a device 102 that performs beamformer-enhanced DOA estimation in accordance with embodiments of the present disclosure.

FIG. 1 illustrates an example of a smart-home environment 100 that includes a device 102 that performs beamformer-enhanced DOA estimation in accordance with embodiments of the present disclosure. The device 102 includes multiple microphones, e.g., the device of FIG. 1 includes three microphones denoted 1, 2, and 3. The device 102 may receive sound from a far-field talker 104, e.g., the operator of the device 102, along a direct path 112, which is the desired DOA, as shown. The environment 100 may be reverberant, e.g., a reverberant room 101 as shown in FIG. 1, in that it reflects sound from the far-field talker 104 such that, in addition to the direct path, the device 102 receives the reflected sound along multiple paths from directions different from the desired DOA, e.g., reflection 1 114, reflection 2 116, and reflection 3 118, as shown. The environment 100 may also include directional noise sources whose sound is received by the device 102, e.g., TV noise 106 from a TV 108 as shown in FIG. 1. Although not shown in FIG. 1, the reverberant environment 100 may also reflect sound from the directional noise sources. Nevertheless, in home environments it is common for the directional component of noise to be dominant. Although a smart-home environment is shown, the described embodiments may be effective in other reverberant environments that include directional noise sources. While the described embodiments address the challenges of DOA estimation for far-field talkers in reverberant environments with directional noise, they may be effective in scenarios with near-field talkers, anechoic environments, and diffused noise.

Figure 2:
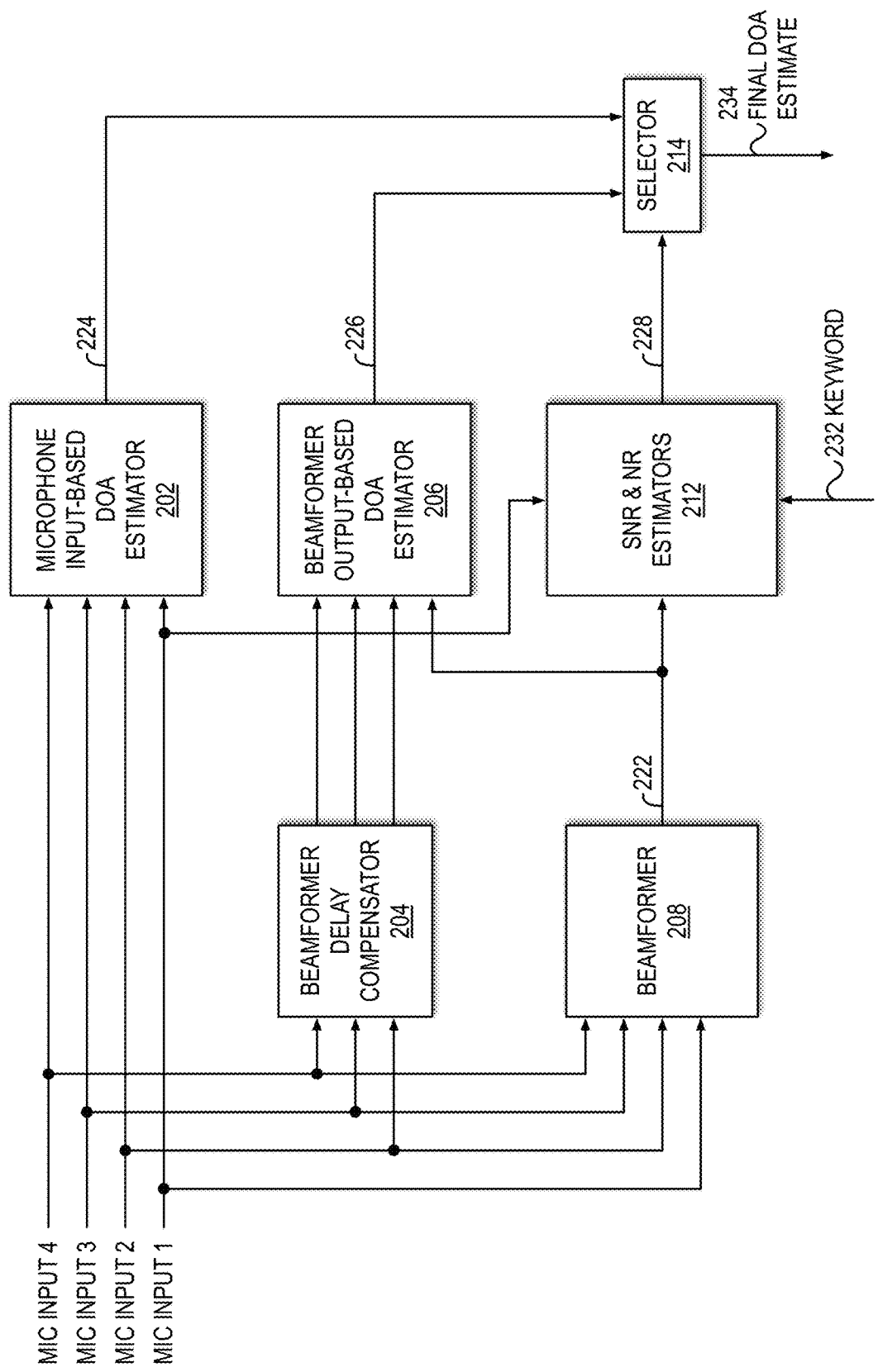
FIGS. 2 through 4 are examples of a DOA estimator such as may be used in a device such as the device of FIG. 1 that combines the advantage of a generalized cross-correlation method in reverberant conditions with the noise reduction capability provided by a beamformer in accordance with embodiments of the present disclosure.

FIG. 2 is an example of a DOA estimator 200 such as may be used in a device such as the device 102 of FIG. 1 that combines the advantage of a generalized cross-correlation method (e.g., GCC-PHAT) in reverberant conditions with the noise reduction capability provided by a beamformer in accordance with embodiments of the present disclosure. The DOA estimator 200 includes a microphone input-based DOA estimator 202, a beamformer output-based DOA estimator 206, a beamformer delay compensator 204, a beamformer 208, SNR and NR estimators 212, and a selector 214. The embodiment of FIG. 2 assumes four microphones in the device 102 that generate four microphone inputs, or signals, denoted MIC INPUT 1, MIC INPUT 2, MIC INPUT 3, and MIC INPUT 4. However, other embodiments are contemplated in which the number of microphones and microphone inputs is different than four, although there are at least two.

The microphone input-based DOA estimator 202 receives MIC INPUTS 1-4 and performs generalized cross-correlation between them to generate a first DOA estimate 224 that is provided as an input to the selector 214. In one embodiment, the microphone input-based DOA estimator 202 uses a GCC-PHAT cross-correlation method according to equation (1) above.

The beamformer 208 performs a beamforming operation on MIC INPUTS 1-4 to generate a beamformer output 222. In the presence of noise, particularly directional noise, e.g., of a TV or music system or vacuum cleaner in a smart-home environment as of FIG. 1, a significant amount of the noise may be removed from the beamformer output 222. The DOA estimator 200 exploits the availability of the beamformer output 222 as a key component in multi-microphone far-field audio processing systems. Specifically, instead of relying solely on the noisy multi-microphone input data to estimate the DOA, embodiments utilize both the multi-microphone inputs and the noise-reduced output 222 from the beamformer 208, as described in more detail below.

In the proposed beamformer enhanced DOA estimation method, the beamformer 208 has a primary microphone signal (e.g., MIC INPUT 1) of which the phase is preserved at the output 222 of the beamformer 208, i.e., the beamformer 208 is constructed such that the beamformer output 222 is time-aligned with respect to the primary microphone signal MIC INPUT 1. An example of such a beamforming architecture is the well-known Generalized Sidelobe Canceller (GSC) based on transfer function (TF) ratios, described in S. Gannot, D. Burshtein, and E. Weinstein, "Signal Enhancement Using Beamforming and Nonstationarity with Applications to Speech," *IEEE Transactions on Signal Processing*, vol. 49, no. 8, pp. 1614-1626, August 2001. In practice, the beamformer processing (signal processing computations applied within the beamformer in order to reduce noise) results in a beamformer output 222 that is time-delayed with respect to the primary microphone signal MIC INPUT 1.

The beamformer delay compensator 204 adds delay to MIC INPUTS 2-4 to generate delayed versions of MIC INPUTS 2-4. The amount of delay added is equal to the delay through the beamformer 208, i.e., the delay between the primary MIC INPUT 1 and the beamformer output 222.

The beamformer output-based DOA estimator 206 receives the beamformer output 222 and the delayed versions of MIC INPUTS 2-4 from the delay compensator 204 and performs generalized cross-correlation between the delayed versions of MIC INPUTS 2-4 and the beamformer output 222 to generate a second DOA estimate 226, or beamformer output-based DOA estimate 226, that is provided as an input to the selector 214. In one embodiment, the beamformer output-based DOA estimator 206 applies a GCC-PHAT method between the delayed versions of MIC INPUTS 2-4 and the beamformer output 222, which may be expressed according to equation (2), $$\hat{\theta} = \underset{\theta}{\mathrm{argmax}} \sum_n \int_{-\infty}^{\infty} \frac{1}{|P_{yx_n}(f)|} P_{yx_n}(f) e^{j2\pi f \tau_{1n}(\theta)} df \quad (2)$$

where $\hat{\theta}$ denotes the second DOA estimate, $P_{yx_n}(f)$ denotes the cross-spectrum for the beamformer noise-reduced output signal y and the delayed nth secondary microphone signal $x_n$, $\tau_{1n}(\theta)$ denotes the time delay for sound propagating from the primary microphone to the nth secondary microphone for a source at DOA θ, j denotes the imaginary number, and f is frequency. The beamformer 208 may provide a significant amount of noise reduction for directional noise since it is spatially localized and tends to be correlated across the microphones. As a result of the SNR improvement, making use of the beamformer output 222 may increase DOA estimation accuracy. In addition, the residual noise at the beamformer output 222 tends to be uncorrelated with the noise at the microphone inputs MIC INPUTS 2-4, which may reduce DOA estimation bias. Thus, by utilizing a combination of the microphone inputs MIC INPUTS 2-4 and beamformer output 222 with generalized cross-correlation (e.g., GCC-PHAT), improved DOA estimation performance may be achieved for a far-field talker in a reverberant environment with directional noise. GCC-PHAT is known for its robustness to reverberation. However, other embodiments are contemplated that include other generalized cross-correlation weighting functions such as smoothed coherence transform (SCOT) and maximum likelihood (ML), which are described in the paper by C. Knapp and G. Carter.

The SNR estimator 212 estimates the SNR at the primary microphone input MIC INPUT 1, and the NR estimator 212 estimates the NR amount at the beamformer output 222. The SNR and NR estimators 212 uses the SNR estimate and the NR amount estimate to generate a control signal 228 to control the selector 214. In one embodiment, the selector 214 adaptively selects the second DOA estimate 226 (i.e., output of the beamformer output-based DOA estimator 206) as the final DOA estimate 234 when the input SNR estimate is low (e.g., below a SNR threshold) and the NR amount estimate is high (e.g., above an NR threshold); otherwise, the selector 214 selects the first DOA estimate 224 (i.e., output of the microphone input-based DOA estimator 202) as the final DOA estimate 234. In such an embodiment, the beamformer output 222 is used for DOA estimation in noisy conditions and when the beamformer 208 is reducing noise, which advantageously ensures that the adverse effect of any distortion of desired talker speech by the beamformer 208 on the final DOA estimate 234 is kept low. Other embodiments are contemplated in which only the SNR estimate is used to generate the control signal 228, and other embodiments are contemplated in which only the NR amount estimate is used to generate the control signal 228.

In one embodiment, the device 102 (e.g., smart home device) provides a means to recognize speech commands from a talker based on known keywords, phrases or biometric features that are known a priori. In the embodiment of FIG. 2, the SNR and NR estimators 212 also receive an indication 232 of whether a keyword from a desired talker has been detected. The SNR and NR estimators 212 estimate the SNR at the microphone inputs and NR amount at the beamformer output 222 based on the signal and noise energy levels measured when the keyword indicator 232 indicates the detection of the keyword from the desired talker. The signal energy is estimated during the detected keyword interval, and the noise energy is estimated outside that interval. The control signal 228 is generated, and the selector 214 outputs the final DOA estimate 234 indicating the desired talker direction from where the keyword originated. In other embodiments, SNR and NR estimators 212 continuously estimate the SNR at the microphone inputs and NR amount at the beamformer output 222 based on the signal and noise levels, i.e., at all times.

The DOA estimator 200 includes analog-to-digital converters (ADC) that convert analog signals (e.g., MIC INPUTS 1-4) to digital values. The DOA estimator 200 also includes a processing element, e.g., a digital signal processor (DSP) (not shown) that performs the various operations shown, e.g., microphone input-based DOA estimator 202, delay compensator 204, beamformer output-based DOA estimator 206, beamformer 208, SNR and NR estimators 212 and selector 214. In many multi-microphone far-field audio processing systems, the processed output of a beamformer is already available. Thus, advantageously the embodiments described herein that include beamformer-based DOA estimation may not add significant footprint (e.g., DSP MIPS and memory consumption) to an existing far-field solution.

Although the embodiment of FIG. 2 includes a single beamformer output, other embodiments are contemplated in which the DOA estimator includes multiple beamformers and multiple corresponding beamformer outputs, and the beamformer output-based DOA estimator performs generalized cross-correlation between one or more of the delayed microphone inputs and one or more of the multiple beamformer outputs to generate the second DOA estimate. Effectively, each beamformer output forms a virtual noise-reduced microphone input, or signal, that may be cross-correlated between various combinations of the delayed real microphone inputs and other virtual microphone inputs. Such embodiments are described with respect to FIGS. 3 and 4.

Figure 3:
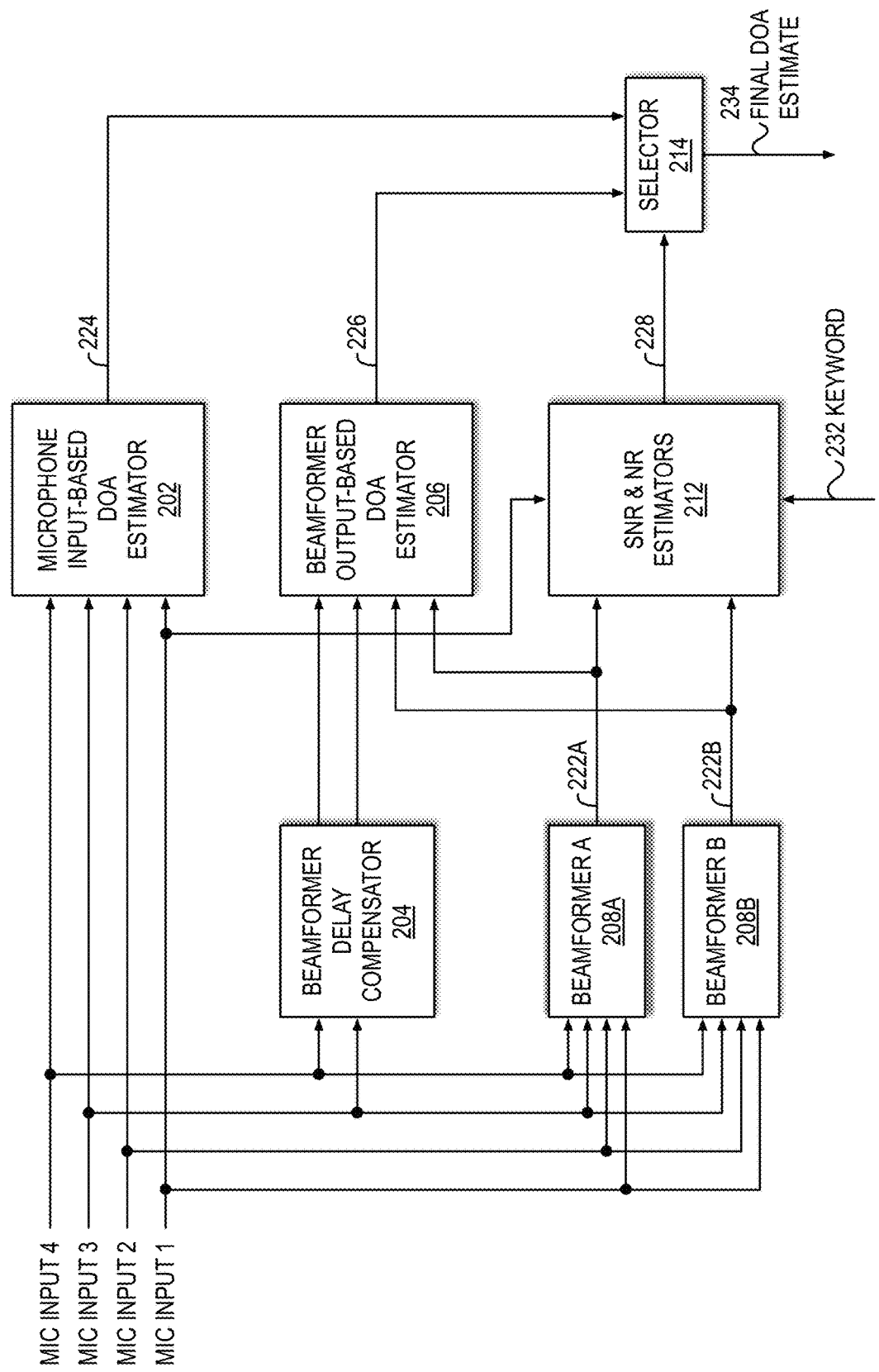

FIG. 3 is an example of a DOA estimator 300 such as may be used in a device such as the device 102 of FIG. 1 that combines the advantage of a generalized cross-correlation method (e.g., GCC-PHAT) in reverberant conditions with the noise reduction capability provided by multiple beamformers in accordance with embodiments of the present disclosure. The DOA estimator 300 of FIG. 3 is similar in many respects to the DOA estimator 200 of FIG. 2. However, the DOA estimator 300 of FIG. 3 includes two beamformers, denoted beamformer A 208A and beamformer B 208B that generate respective beamformer outputs 222A and 222B which are provided to the beamformer output-based DOA estimator 206 and the SNR and NR estimators 212.

The beamformer output 222A of beamformer A 208A is delayed with respect to the primary microphone signal MIC INPUT 1, and the beamformer output 222B of beamformer B 208B is delayed with respect to the primary microphone signal MIC INPUT 2. In the embodiment of FIG. 3, it is assumed that these beamformer processing delays are the same for both beamformers A 208A and B 208B. The beamformer delay compensator 204 adds delay to MIC INPUTS 3-4 to generate delayed versions of MIC INPUTS 3-4. The amount of delay added is equal to the delay through the beamformers A 208A and B 208B. The beamformer output-based DOA estimator 206 receives the beamformer outputs 222A and 222B and the delayed versions of MIC INPUTS 3-4 from the delay compensator 204 and performs generalized cross-correlation between the delayed versions of MIC INPUTS 3-4 and beamformer outputs 222A and 222B to generate the second DOA estimate 226 that is provided as an input to the selector 214. In one embodiment, the beamformer output-based DOA estimator 206 applies a GCC-PHAT method between the delayed versions of MIC INPUTS 3-4 and the beamformer outputs 222A and 222B, which may be expressed according to equation (3), $$\hat{\theta} = \underset{\theta}{\operatorname{argmax}} \sum_{m,n} \int_{-\infty}^{\infty} \frac{1}{|P_{y_m x_n}(f)|} P_{y_m x_n}(f) e^{j2\pi f \tau_{mn}(\theta)} df \quad (3)$$

where $\hat{\theta}$ denotes the second DOA estimate, $P_{y_m x_n}(f)$ denotes the cross-spectrum for the mth beamformer noise-reduced output signal $y_m$ and the delayed nth secondary microphone signal $x_n$, $\tau_{mn}(\theta)$ denotes the time delay for sound propagating from the mth primary microphone and the nth secondary microphone for a source at DOA $\theta$, j denotes the imaginary number, and f is frequency. The beamformers 208A and 208B may provide a significant amount of noise reduction for directional noise sources since they are spatially localized and tend to be correlated across the microphones. As a result of the SNR improvement, making use of the beamformer outputs 222A and 222B may increase DOA estimation accuracy. In addition, the residual noise at the beamformer outputs 222A and 222B tends to be uncorrelated with the noise at the microphone inputs MIC INPUTS 3-4, which may reduce DOA estimation bias. Thus, by utilizing a combination of the microphone inputs MIC INPUTS 3-4 and beamformer outputs 222A and 222B with generalized cross-correlation (e.g., GCC-PHAT), improved DOA estimation performance may be achieved for a far-field talker in a reverberant environment with directional noise.

Figure 4:
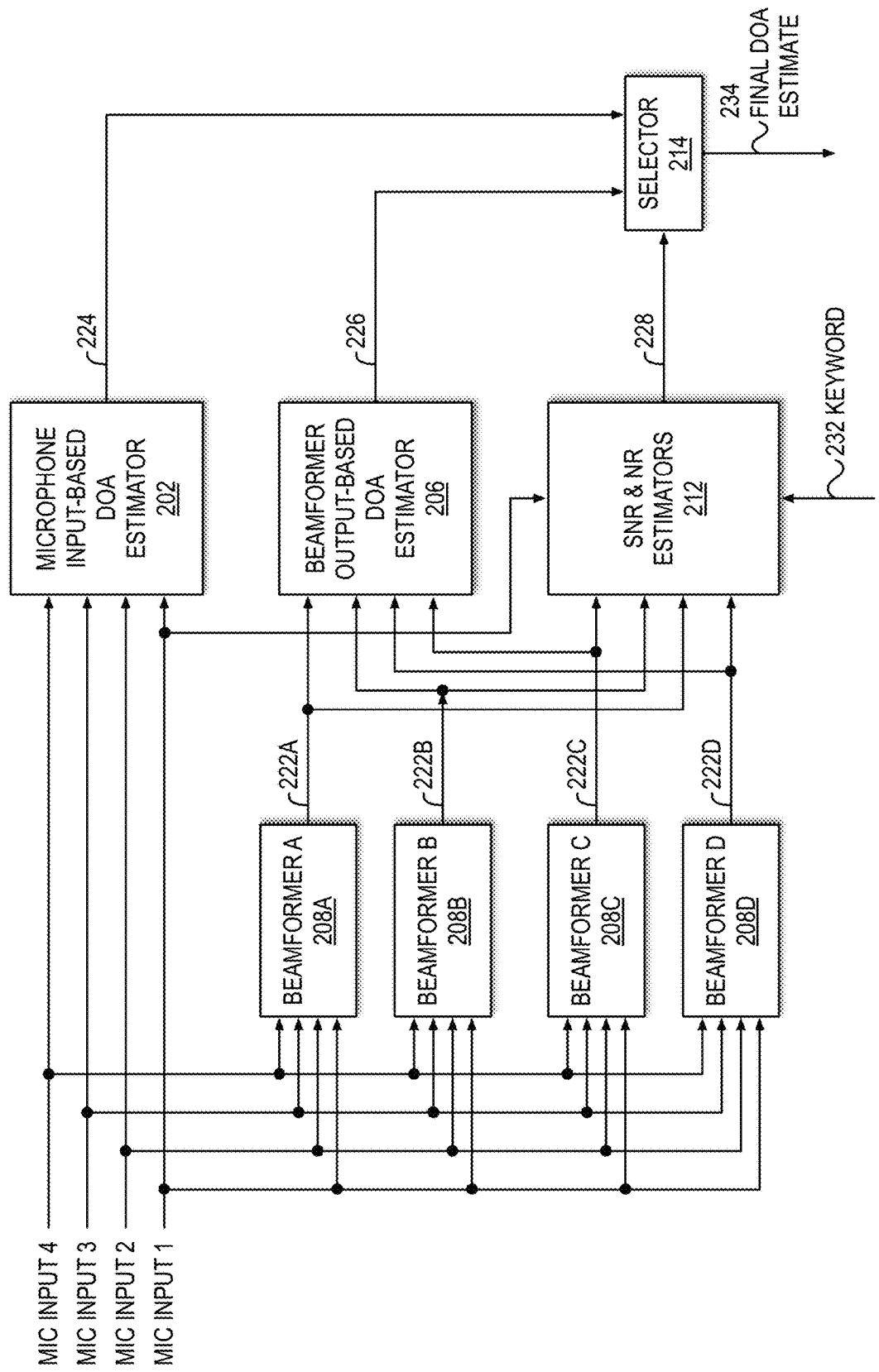

FIG. 4 is an example of a DOA estimator 400 such as may be used in a device such as the device 102 of FIG. 1 that combines the advantage of a generalized cross-correlation method (e.g., GCC-PHAT) in reverberant conditions with the noise reduction capability provided by multiple beamformers in accordance with embodiments of the present disclosure. The DOA estimator 400 of FIG. 4 is similar in many respects to the DOA estimator 200 of FIG. 2. However, the DOA estimator 400 of FIG. 4 includes four beamformers, denoted beamformer A through D 208A through 208D that generate respective beamformer outputs 222A through 222D which are provided to the beamformer output-based DOA estimator 206 and the SNR and NR estimators 212. The beamformer outputs 222A through 222D of beamformers A through D 208A through 208D are delayed with respect to the primary microphone signals MIC INPUTS 1-4, respectively. In the embodiment of FIG. 4, it is assumed that these beamformer processing delays are same for all beamformers A through D 208A through 208D. The beamformer output-based DOA estimator 206 receives the beamformer outputs 222A through 222D and performs generalized cross-correlation between them to generate a second DOA estimate 226 that is provided as an input to the selector 214. In one embodiment, the beamformer output-based DOA estimator 206 applies a GCC-PHAT method between the beamformer outputs 222A through 222D, which may be expressed according to equation (4), $$\hat{\theta} = \underset{\theta}{\operatorname{argmax}} \sum_{m,n} \int_{-\infty}^{\infty} \frac{1}{|P_{y_m y_n}(f)|} P_{y_m y_n}(f) e^{j2\pi f \tau_{mn}(\theta)} df \quad (4)$$

where $\hat{\theta}$ denotes the second DOA estimate, $P_{y_m y_n}(f)$ denotes the cross-spectrum for the mth and the nth beamformer noise-reduced output signals $y_m$ and $y_n$, respectively, $\tau_{mn}(\theta)$ denotes the time delay for sound propagating from the mth microphone to the nth microphone for a source at DOA $\theta$, j denotes the imaginary number, and f is frequency. The beamformers 208A through 208D may provide a significant amount of noise reduction for directional noise sources since they are spatially localized and tend to be correlated across the microphones. As a result of the SNR improvement, making use of the beamformer outputs 222A through 222D may increase DOA estimation accuracy. Thus, by utilizing a combination of the beamformer outputs 222A through 222D with generalized cross-correlation (e.g., GCC-PHAT), improved DOA estimation performance may be achieved for a far-field talker in a reverberant environment with directional noise.

Although the embodiments of FIGS. 2 through 4 illustrate beamformer delay compensation applied to one or more microphone inputs only, other embodiments are contemplated in which delay compensation is applied to one or more microphone inputs and one or more beamformer outputs, which may be needed in scenarios where the beamformer processing delays are not the same for all beamformers.

Although the embodiments of FIGS. 2 through 4 include a single second DOA estimate (i.e., a single beamformer output-based DOA estimator), other embodiments are contemplated in which multiple second DOA estimates are generated (i.e., multiple beamformer output-based DOA estimates). These estimates may be generated, for example, by using more than one of the beamformer output-based DOA estimates shown in FIGS. 2 through 4. The selector chooses one of the multiple second DOA estimates, e.g., based upon which of the multiple second DOA estimates has the highest NR amount estimate (and selects the first DOA estimate when the SNR estimate and/or the NR amount estimate do not meet the threshold criteria).

Although the described embodiments of the present disclosure include a second DOA estimator based on beamformer noise-reduced outputs, other embodiments are contemplated that include a second DOA estimator based on outputs additionally processed to reduce reverberation, i.e. outputs with dereverberation processing.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. An estimator of a final direction of arrival (DOA) of speech from a far-field talker to a device in the presence of room reverberation and directional noise, comprising:
   a first DOA estimate obtained by correlating inputs of multiple microphones;
   a second DOA estimate obtained by correlating a beamformer output and at least one of:
   a delayed version of the multiple microphone inputs; and
   one or more other beamformer outputs;
   one or more of:
   a signal-to-noise ratio (SNR) estimator that estimates a SNR estimate at at least one of the multiple microphone inputs; and
   a noise reduction (NR) estimator that estimates a NR amount estimate at the beamformer output;
   a selector that selects one of the first DOA estimate and the second DOA estimate as the final DOA estimate based on at least one of the SNR estimate and the NR amount estimate.

2. The DOA estimator of claim 1,
   wherein to select one of the first DOA estimate and the second DOA estimate as the final DOA estimate based on at least one of the SNR estimate and the NR amount estimate, the selector:
   selects the second estimated DOA when the SNR estimate is below a first threshold and the NR amount estimate is above a second threshold; and
   otherwise selects the first estimated DOA.

3. The DOA estimator of claim 1,
   wherein one or more of the SNR estimate and the NR amount estimate are generated in response to detection of a keyword from a desired talker.

4. The DOA estimator of claim 1,
   wherein one or more of the SNR estimate and the NR amount estimate are generated continuously.

5. The DOA estimator of claim 1,
   wherein the first DOA estimate is obtained by performing generalized cross-correlation between the multiple microphone inputs; and
   wherein the second DOA estimate is obtained by performing generalized cross-correlation between the beamformer output and the at least one of: the delayed version of the multiple microphone inputs and the one or more other beamformer outputs.

6. The DOA estimator of claim 5,
   wherein performing the generalized cross-correlation comprises performing a generalized cross-correlation phase transform (GCC-PHAT) method.

7. The DOA estimator of claim 5,
   wherein the directional noise is reduced in the beamformer output;
   wherein residual noise at the beamformer output is substantially uncorrelated with noise at the multiple microphone inputs; and
   wherein the generalized cross-correlation performed reduces detrimental effects of the room reverberation and directional noise.

8. A method for estimating a final direction of arrival (DOA) of speech from a far-field talker to a device in the presence of room reverberation and directional noise, comprising:
   estimating a first DOA by correlating inputs of multiple microphones;
   estimating a second DOA by correlating a beamformer output and at least one of:
   a delayed version of the multiple microphone inputs; and
   one or more other beamformer outputs;
   estimating one or more of:
   a signal-to-noise ratio (SNR) at at least one of the multiple microphone inputs; and
   a noise reduction (NR) amount at the beamformer output; and
   selecting one of the first DOA estimate and the second DOA estimate as the final DOA estimate based on at least one of the SNR estimate and the NR amount estimate.

9. The method of claim 8,
   wherein said selecting one of the first DOA estimate and the second DOA estimate as the final DOA estimate based on at least one of the SNR estimate and the NR amount estimate comprises:
   selecting the second estimated DOA when the SNR estimate is below a first threshold and the NR amount estimate is above a second threshold; and
   otherwise selecting the first estimated DOA.

10. The method of claim 8,
    wherein said estimating one or more of the SNR and the NR amount is performed in response to detection of a keyword from a desired talker.

11. The method of claim 8,
wherein said estimating one or more of the SNR and the NR amount is continuously performed.

12. The method of claim 8,
wherein said estimating the first DOA comprises performing generalized cross-correlation between the multiple microphone inputs; and
wherein said estimating the second DOA comprises performing generalized cross-correlation between the beamformer output and the at least one of: the delayed version of the multiple microphone inputs and the one or more other beamformer outputs.

13. The method of claim 12,
wherein said performing generalized cross-correlation comprises performing a generalized cross-correlation phase transform (GCC-PHAT) method.

14. The method of claim 12,
wherein the directional noise is reduced in the beamformer output;
wherein residual noise at the beamformer output is substantially uncorrelated with noise at the multiple microphone inputs; and
wherein said performing generalized cross-correlation reduces detrimental effects of the room reverberation and directional noise.

* * * * *